US012192255B2

(12) United States Patent
Gupta et al.

(10) Patent No.: US 12,192,255 B2
(45) **Date of Patent: *Jan. 7, 2025**

(54) SYSTEMS AND METHODS FOR SELECTING A LOCAL DEVICE IN A COLLABORATIVE ENVIRONMENT

(71) Applicant: Adeia Guides Inc., San Jose, CA (US)

(72) Inventors: Vikram Makam Gupta, Karnataka (IN); Pooja Srivastava, Bengaluru (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,022

(22) Filed: Jul. 27, 2023

(65) Prior Publication Data

US 2023/0370509 A1 Nov. 16, 2023

Related U.S. Application Data

(63) Continuation of application No. 17/833,181, filed on Jun. 6, 2022, now Pat. No. 11,757,954, which is a continuation of application No. 17/366,390, filed on Jul. 2, 2021, now Pat. No. 11,394,758.

(51) Int. Cl.

*H04L 12/28* (2006.01)
*H04L 12/26* (2006.01)
*H04L 43/08* (2022.01)
*H04L 65/401* (2022.01)

(52) U.S. Cl.

CPC .......... *H04L 65/4015* (2013.01); *H04L 43/08* (2013.01)

(58) Field of Classification Search

CPC ..... H04L 65/4015; H04L 43/08; H04L 12/28; H04L 12/2803

USPC .......................................................... 709/204

See application file for complete search history.

(56) References Cited

U.S. PATENT DOCUMENTS

| | | | | |
|---|---|---|---|---|
| 6,842,460 | B1 | 1/2005 | Olkkonen et al. | |
| 10,181,218 | B1 | 1/2019 | Goetzinger et al. | |
| 10,341,739 | B2 * | 7/2019 | Klappert | H04N 21/2665 |
| 10,607,039 | B1 * | 3/2020 | Kinderman | G05B 17/02 |
| 11,394,758 | B1 | 7/2022 | Gupta et al. | |
| 11,757,954 | B2 * | 9/2023 | Gupta | H04L 65/80 709/204 |
| 2003/0045314 | A1 * | 3/2003 | Burgan | H04L 12/1845 455/519 |
| 2011/0182238 | A1 * | 7/2011 | Marshall | H04W 64/00 370/328 |
| 2012/0297440 | A1 | 11/2012 | Beals et al. | |
| 2017/0033877 | A1 * | 2/2017 | Chen | H04B 17/309 |
| 2017/0201289 | A1 * | 7/2017 | Zhang | H04B 7/0608 |
| 2017/0280030 | A1 | 9/2017 | Leip | |
| 2018/0234612 | A1 | 8/2018 | Kunkel et al. | |
| 2019/0089701 | A1 | 3/2019 | Mercury et al. | |

(Continued)

*Primary Examiner* — Jude Jean Gilles

(74) *Attorney, Agent, or Firm* — Haley Guiliano LLP

(57) ABSTRACT

For each device in a collaborative environment, qualities of system characteristics are determined. Based on the respective qualities of each device, a subset of devices is identified, including at least one device having a highest first quality and at least one device having a highest second quality, each corresponding to a different system characteristic. One or more devices from the subset of devices are then selected, based on the first quality and the second quality of each device of the subset of devices, to perform a function associated with the respective system characteristic.

20 Claims, 7 Drawing Sheets

102
104
106
100
Meeting Room Circuitry
108
110
112

(56) References Cited

U.S. PATENT DOCUMENTS

| | | | |
|---|---|---|---|
| 2019/0129964 | A1 | 5/2019 | Corbin et al. |
| 2019/0304157 | A1 | 10/2019 | Amer et al. |
| 2019/0357292 | A1* | 11/2019 | Cirik .................... H04L 5/0053 |
| 2020/0037029 | A1 | 1/2020 | He et al. |
| 2020/0273451 | A1* | 8/2020 | Kim ........................ G10L 25/60 |
| 2020/0280869 | A1 | 9/2020 | Biswas et al. |
| 2020/0412425 | A1 | 12/2020 | Laghate et al. |
| 2021/0152892 | A1 | 5/2021 | Ramaswamy |
| 2021/0185276 | A1 | 6/2021 | Peters et al. |
| 2021/0367693 | A1 | 11/2021 | S et al. |
| 2023/0007066 | A1 | 1/2023 | Gupta et al. |

* cited by examiner

SYSTEMS AND METHODS FOR SELECTING A LOCAL DEVICE IN A COLLABORATIVE ENVIRONMENT

CROSS-REFERENCE TO RELATED APPLICATIONS

This application is a continuation of U.S. patent application Ser. No. 17/833,181, filed Jun. 6, 2022, which is a continuation of U.S. patent application Ser. No. 17/366,390, filed Jul. 2, 2021 (now U.S. Pat. No. 11,394,758). The disclosures of which are hereby incorporated by reference herein in their entireties.

BACKGROUND

This disclosure is directed to collaborative environments, such as virtual meetings, and collaborative environment settings, such as meeting rooms, and ensuring meetings run smoothly without technical issues with sound interference due to multiple devices being used within one setting. In particular, techniques are disclosed for selecting a local device within a collaborative environment setting to perform a particular function within the collaborative environment.

SUMMARY

In a working environment, there is often need for occasions where people need to work together. In such situations, it is usually most effective to organize a collaborative environment (e.g., a meeting) in which the relevant people can participate. Such a collaborative environment could also be a social event where not all participants are able to be in the same physical location. In situations where a meeting or event is organized, but some participants are in one location, such as an office meeting room, while other participants are in other locations, such as in their homes or in another office meeting room, it is necessary to hold the meeting using conference calling or video meeting technology. Participants will often each have their own device for accessing the meeting or call, even if attending the meeting or event in the same room as other participants. The room in which they are sitting (i.e., the setting) may also have its own audio-visual facilities, such as a web cam, which may or may not also include a microphone and/or speakers; a conference call hub, which may include one or more microphones and/or speakers and also may be linked to one or more additional microphones connected by long leads (known as spokes), or connected wirelessly such that people sitting farther from the hub may be heard via the microphones. If each participant in a meeting is using their own device to access the meeting, the resulting sound is often compromised by the "echo" of hearing other people directly and also via various speakers in the room. This means that sound quality can be unclear and make it difficult for people to understand or participate in the meeting efficiently. For anyone participating in the meeting who is not in the room, perhaps if they are working at home, the sound quality may be even more unclear as they will hear the sound picked up by several microphones and possibly through several speakers, as well as through the speakers of their personal device.

Furthermore, generally in a conference room setting with multiple participants each having their own device, not all devices will be connected to a power supply, and some may become depleted of battery power during the meeting. Some devices may have many background programs running, which may slow down the audio or video signals causing a delay or inconsistencies in the input or output of audio and video signal. Some devices may be of a higher specification than others and will have a higher resolution screen, or a larger screen than other devices.

Some meeting room settings attempt to solve these issues by having one large central audio-visual system, such as a projector, a screen, ceiling or wall speakers and wired internet. However, issues, particularly with sound, still occur with participants at different distances from the microphones. Furthermore, if there is a problem with a central system, the meeting cannot go ahead at all.

Therefore, there is a need, especially in present times with hybrid working (some people in the office, some people at home) becoming more and more prevalent, for a system to ensure meetings can take place efficiently and effectively when multiple devices are joined to a meeting, particularly in the same room. It may be useful to be able to use just one device for, e.g., a microphone and speaker and video. However, one such device may have a good microphone quality, but the speakers may not be of a high enough quality to serve the whole meeting room. Accordingly, there is a need for a system that is able to identify one or more local devices from a plurality of devices in a collaborative environment setting that have a highest quality of one or more system characteristics and select said one or more devices for one or more functions related to the characteristics, such that the collaborative environment is not disrupted by multiple devices all performing the same multiple functions throughout the duration of the meeting.

Accordingly, the present invention relates to a method for selecting one or more local devices in a collaborative environment setting. For each device in the collaborative environment, first and second qualities of a first and second system characteristic, respectively, of the device are determined. The first system characteristic and the second system characteristic may be different and may each be selected from the list consisting of microphone quality, speaker quality, video capture quality, video display quality, screen resolution, power availability, internet connection quality, network bandwidth and device operating system speed. The collaborative environment setting may be a meeting where several participants are in the same meeting room in an office building. There may be additional participants joining from other locations, perhaps their individual homes or may be another group of participants in a different meeting room in a different location. The collaborative environment may therefore be only in one physical setting or may be spread over several physical settings that are all joined to one virtual meeting or event. Each physical setting may have only one participant with one device or may include several participants, each with their own device. Based on the respective first quality and second quality of each device of the plurality of devices, a subset of devices of the plurality of devices is identified, including at least one device having a highest first quality and at least one device having a highest second quality. One or more devices from the subset of devices are then selected based on the first quality and the second quality of each device of the subset of devices. In some embodiments, once the one or more devices are selected, the first and second system characteristics of at least one device not selected may be disabled.

A device having a second-highest quality for a system characteristic as a back up may be identified, in case the device having the highest-quality fails or if the user does not agree to allow their device to be selected. If the device having the highest quality system characteristic fails, cannot be selected, or is manually deselected by a user, the device with the second-highest quality of the system characteristic may be selected.

The first system characteristic may be relevant for a first function in the collaborative environment, and the second system characteristic may be relevant for a second function in the collaborative environment. The functions may be any function that is used in a collaborative environment setting, such as a microphone, speaker, internet, camera, video (real-time or playback), screen or display. A first selected device having the highest first quality to perform the first function and a second selected device having the highest second quality may each be instructed to perform the first and second function, respectively.

The first selected device and the second selected device may be the same device, should the device have the highest quality of more than one characteristic. The first selected device and the second selected device may be different devices, meaning they are separate devices and also that they may be different types of devices. Each device may be a laptop computer, a mobile telephone, a tablet, a projector, a television, a conference call hub which may include spokes, devices such as Amazon Alexa or Google Home, a smart watch, a desktop computer, a speaker (free standing or wall- or ceiling-mounted), a microphone or a monitor.

For a duration of the collaborative environment setting, the first quality of the first characteristic may be periodically redetermined, and the second quality of the second characteristic may be periodically redetermined. It may be that at one or more points in the duration of the collaborative setting one or more of the selected devices is no longer providing the highest-quality characteristic for which it was selected. Therefore, periodic determinations of the quality of the first system characteristic and the quality of the second system characteristic for the duration of the setting ensure the meeting runs efficiently and effectively with minimal or no interruptions. If a change in the quality of one or more characteristics is determined, in response to determining a change in the first quality, a first device previously selected to perform the first function may be deselected, and a third device having a current highest first quality to perform the first function may be selected. In response to determining a change in the second quality, a second device previously selected to perform the second function may be deselected, and a fourth device having a current highest second quality to perform the second function may be selected.

Negative feedback from a user of the collaborative environment related to a first function may be received, and as such, human input may contribute to the selection of a device. In response to receiving the negative feedback, a first device selected to perform the first function may be deselected, and a different device from the plurality of devices to perform the first function may be selected.

In order that a user of a device knows that their device has been selected, a notification that the device has been selected to perform at least one function in the collaborative environment may be generated for output at a selected device.

As an example, a meeting may take place involving ten participants in three separate settings. Six of the participants are together in a meeting room in an office in London (Anna, Bob, Claire, Danny, Ellen and Fred), three others are in a meeting room in New York (Gail, Harry and Isla) and one is at their home in Vancouver (Jon). The meeting is a video meeting and includes a presentation involving a slide deck and a playback of a pre-recorded video. At the end there is time for a discussion, which happens in a Zoom- or Teams-type format where each of the participants is seen on a display.

Using the methods and systems of the invention, at the start of the meeting, the quality of the relevant characteristics of each device in the London meeting room is determined. The characteristics may be audio quality (microphone and speaker), display quality, video playback capability, power remaining, operating system capability and internet connection.

Anna's device, a laptop, is chosen as the speaker, since it has the highest-quality speaker and plenty of power, a good internet connection and a fast operating system. A pop-up box appears on Anna's screen to let her know the device has been chosen, and she clicks "OK".

Bob's device, a tablet, has the highest-quality microphone. However, it isn't plugged into a power supply and the battery is running fairly low, and the device is running an old and slow operating system. Therefore, Bob's device is not selected for the microphone function.

Fred's device has a good-quality microphone, and the power level and operating system are running at a higher level than Bob's device. Fred's device is selected as the microphone, and the system notifies Fred accordingly, who agrees.

The London meeting room has a central audio-visual (AV) system, with a projector and a large screen. This device is selected as the device on which to display the visual aspects of the meeting, i.e., the slides, the video and the individual video capture of each of the participants, respectively, depending on which part of the meeting is in progress at any one time.

Danny's and Ellen's devices are also not selected, and so all microphones, speakers and cameras are disabled on Bob's, Claire's, Danny's and Ellen's devices. Fred's device has the speaker disabled, and Anna's device has the microphone disabled.

In the New York meeting room, there is no central AV system. Isla has a brand new top-of-the-range laptop, and she is not running any other programs in the background. Isla's device is therefore selected as the device to use as the microphone, the speaker and for video playback. Gail and Harry have their devices disabled for these functions. Jon's device is used for all functions, since in his setting of the collaborative environment, his laptop is the only device. It may be that Jon links his laptop to a monitor, which has its own speakers and display. In this case, the collaborative environment setting would have two devices, and the control circuitry would determine which of Jon's laptop or the monitor has the highest quality speakers and display and select the device accordingly.

During the first part of the meeting, Danny is presenting some slides. He is sitting near Fred, and when the system periodically redetermines the quality of the relevant characteristics, it is determined that Fred's microphone should remain selected, even though Danny is closer to his own microphone. It may be that Danny has a slow operating system, or less power, or a low-quality microphone.

After the slides have been presented, Jon wants to show a pre-recorded video. He introduces this and then plays it. It is determined that the video be displayed on the central AV system in London, and on Isla's laptop in New York. Jon's laptop display is used in Vancouver. The system, during its periodic review of the quality of the characteristics of each device in the collaborative environment setting, determines that Anna's laptop is now running several background programs and this is affecting the audio quality. The system therefore deselects Anna's device's speaker and selects Ellen's device as the speaker for the London meeting room. After a short time, Ellen receives a notification on her device asking if the speaker function is satisfactory. Bob and Claire report that they cannot hear the video sound well, so Ellen clicks NO and the system redetermines that the central AV system speakers are the highest quality and selects those, deselecting Ellen's device simultaneously.

After the video has finished, each participant is invited to speak. The system of the invention determines periodically which device has the highest-quality audio input each time a different participant speaks. Most often this results in the speaker's device being selected as the microphone for the duration of that participant speaking, but sometimes, as in Danny's case, Fred's device's microphone is determined to be better and therefore, Danny's device's microphone remains deselected throughout. Each participant uses their own device's camera, and the display is only shown on the one device, as above, in each location of the collaborative setting.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
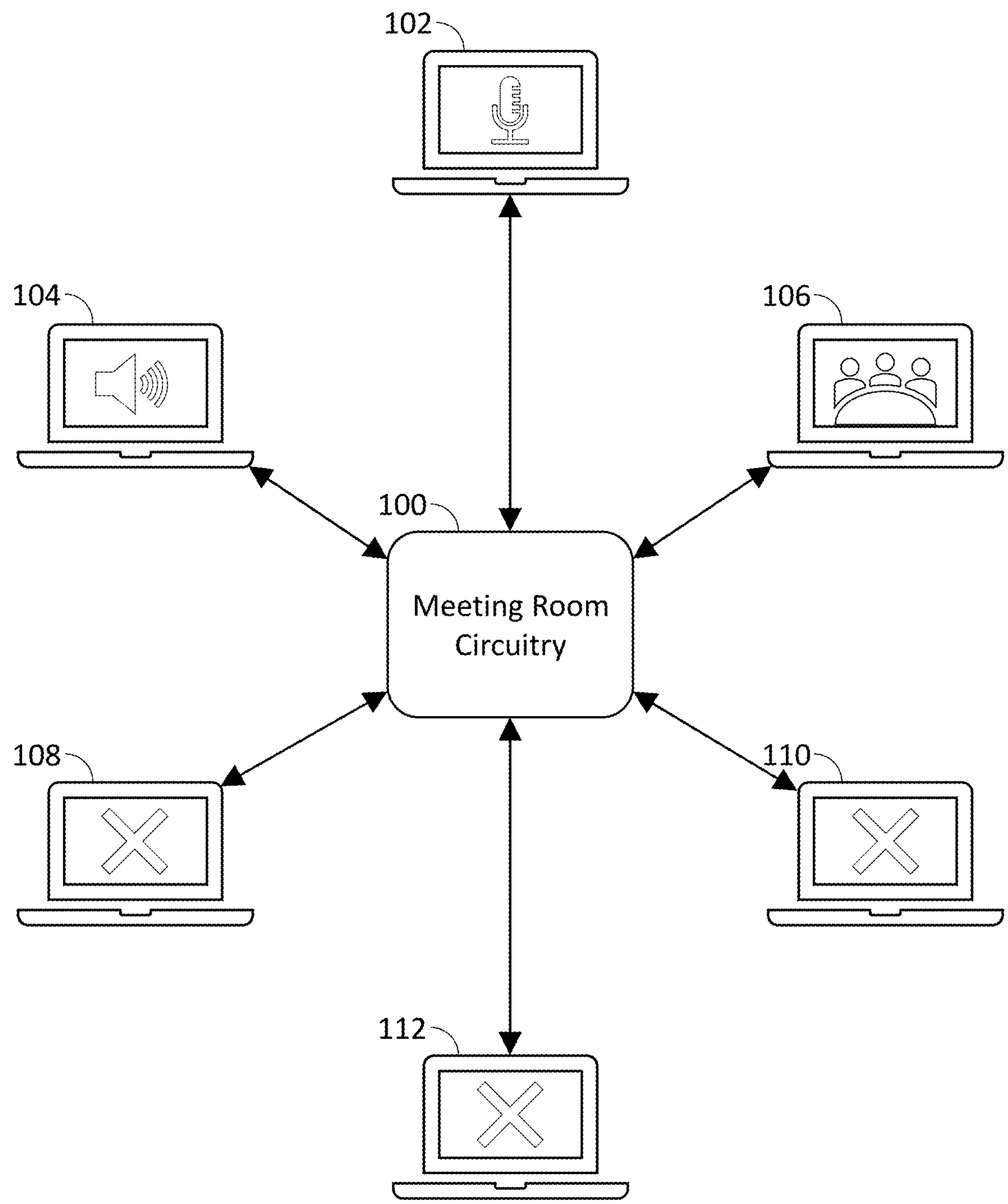
FIG. 1 shows an exemplary scenario in which several devices are being used within a single room to access the same meeting, in accordance with some embodiments of the disclosure.

FIG. 1 shows an exemplary scenario in which several devices are being used within a single collaborative environment setting (a meeting room) to access the same meeting. Meeting room control circuitry 100 connects with six Devices 102, 104, 106, 108, 110, 112 present in the meeting room. Meeting room control circuitry 100 assesses system characteristics such as the audio input, audio output and video characteristics of each of the devices and selects Device 102 to use as the microphone for the whole room, such that echoes and inconsistent sound are reduced or eliminated. Device 102 may be a device that is personal to one of the participants, such as a laptop, mobile telephone or a tablet. Device 102 may be a conference call hub of the type that is placed in the center of a meeting room table that generally includes a microphone and a speaker. If Device 102 is selected only for its microphone capabilities, the speaker or any other capabilities may be disabled. Device 104 may be selected by meeting room control circuitry 100 to act as the sole speaker for the meeting room in this particular meeting or collaborative environment setting. The speaker that is used may be on a personal device such as a laptop or tablet, or it may be a speaker in the meeting room, such as ceiling-mounted speaker system or a speaker integrated into an AV system, but the display is disabled. Device 106 may be selected as the display device. The display may be a video display of each of the participants in the meeting, such as a Zoom or Teams display, or it could be a display of a presentation, such as a slide deck, or a pre-recorded video. Device 106 may be a personal device of one of the participants, such as a laptop or a tablet, or it may be a projector in the meeting room that is able to display the content on a large screen easily visible to all participants in the meeting room.

In the scenario in FIG. 1, control circuitry 100 may periodically review the devices in the collaborative environment for the highest-quality signal of each of audio input, audio output and display, and if these no longer correspond to Device 102, Device 104 and Device 106 respectively, an alternative device, such as Device 108, Device 110 or Device 112 may be selected. For example, Device 102 may no longer have the highest-quality microphone characteristic, and will therefore be deselected. Device 104 may have the highest-quality microphone characteristic upon review and therefore would become the selected device for both microphone and speaker.

The devices in the room may all be connected to a local network such that they are able to communicate with each other, such as a mesh network, or a partial mesh network. Alternatively, the devices in the setting may be each independently connected to the internet, and the control circuitry is able to use the connection to communicate, determine, and instruct each device in the setting, in the absence of a local or mesh network.

The collaborative environment may span several settings, in which case control circuitry 100 in each setting would determine a Device 102, 104, 106, 108, 110 or 112 from a plurality of devices in each setting having the highest quality of a characteristic.

Figure 2:
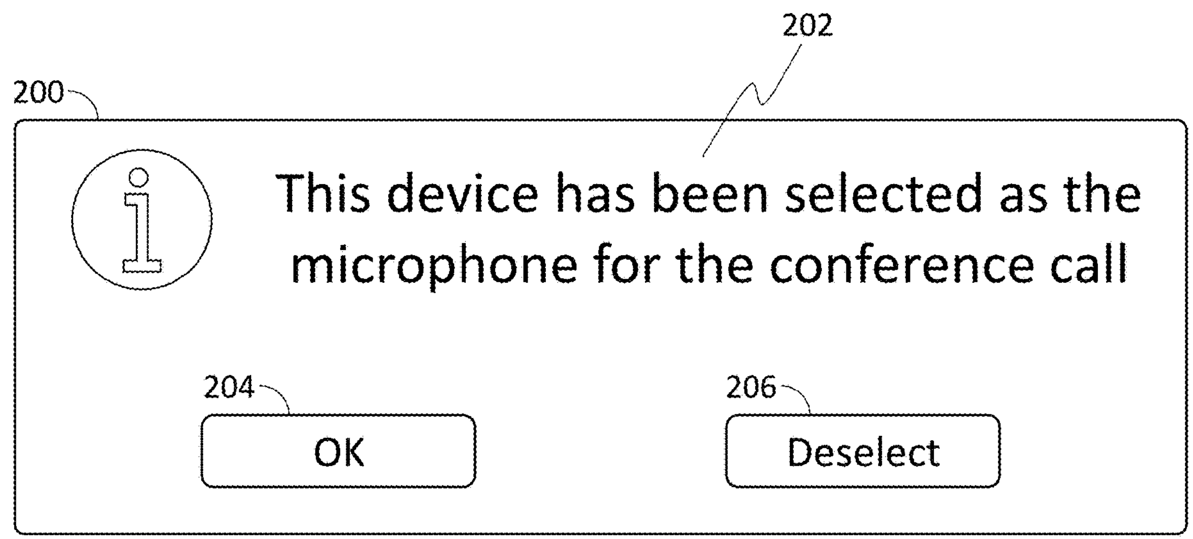
FIG. 2 shows an exemplary notification box, which may appear on the display of a selected device to notify the user of the device that the device has been selected, in accordance with some embodiments of the disclosure.

FIG. 2 shows an exemplary notification box 200, which may appear on the display of a selected device to notify the user of the device that the device has been selected 202. Notification box 200 may be displayed on the screen of a device such as a laptop or tablet in response to the device being selected for having the highest-quality of a system characteristic (for example, at 514 or 518 in the process exemplified in FIG. 5). In the example of FIG. 2, the device has been determined to have the highest-quality audio input characteristic, and the device has been selected to be used as the microphone for the environment. The notification box may give the user the option to agree to continue with the selection of their device by clicking a sub-box to indicate that the user agrees, such as an OK box 204. If the user clicks OK, 204, the device will be selected and other devices in the environment disabled for the microphone function. The user may not wish to have their device selected, and the notification box may give the user the option to have their device deselected, such as a box indicating DESELECT 206. If the user chooses to have their device deselected, a device having the second-highest quality for that characteristic, in this example the microphone, would be selected by control circuitry. Once the user has clicked OK 204 or DESELECT 206, the notification box 200 closes and disappears from view.

Figure 3:
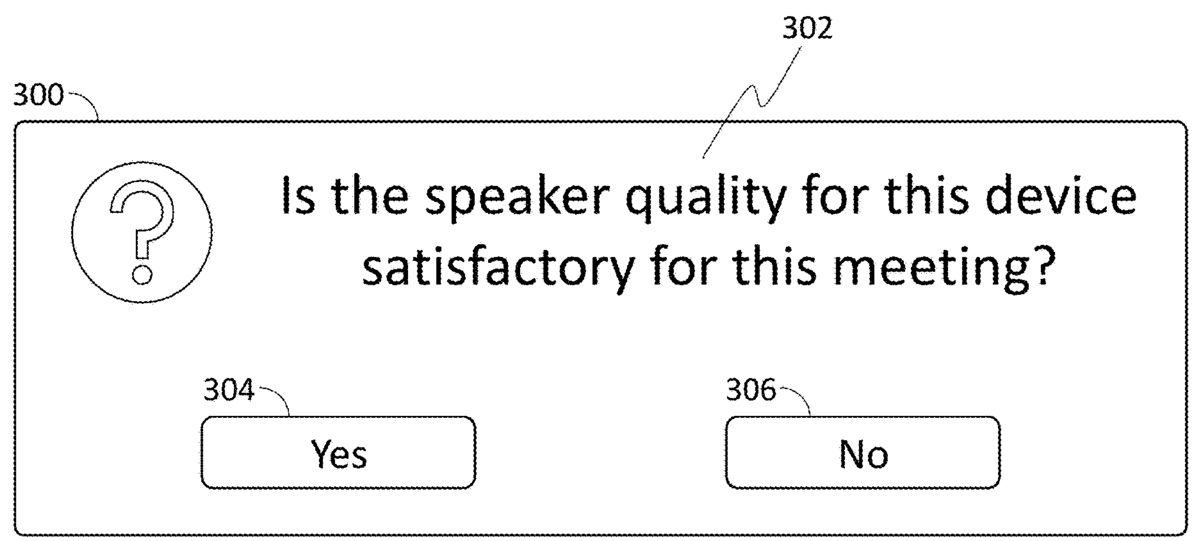
FIG. 3 is an exemplary notification box, which may appear on the display of a selected device to request feedback from the user of the device on the quality of the selected function, in accordance with some embodiments of the disclosure.

FIG. 3 shows an exemplary notification box 300, which may appear on the display of a selected device performing a function associated with a highest quality of a characteristic to request feedback from the user of the device on the quality of the function for which that device has been selected 302. It may be displayed after a predetermined period of time after having been selected, long enough for the user to notice whether the quality is satisfactory, such as 30 seconds or one minute. The user is given two options to indicate whether the quality is satisfactory, YES 304 and NO 306. If the user indicates NO by clicking on the NO box 306, i.e., the feedback is negative, the device may be deselected and a different device selected by control circuitry to perform the function. The different device may be determined by the process shown in FIG. 5, where the device indicated by the user to not have satisfactory quality of the characteristic is no longer included in the assessment of all devices in the environment for that characteristic.

Figure 4:
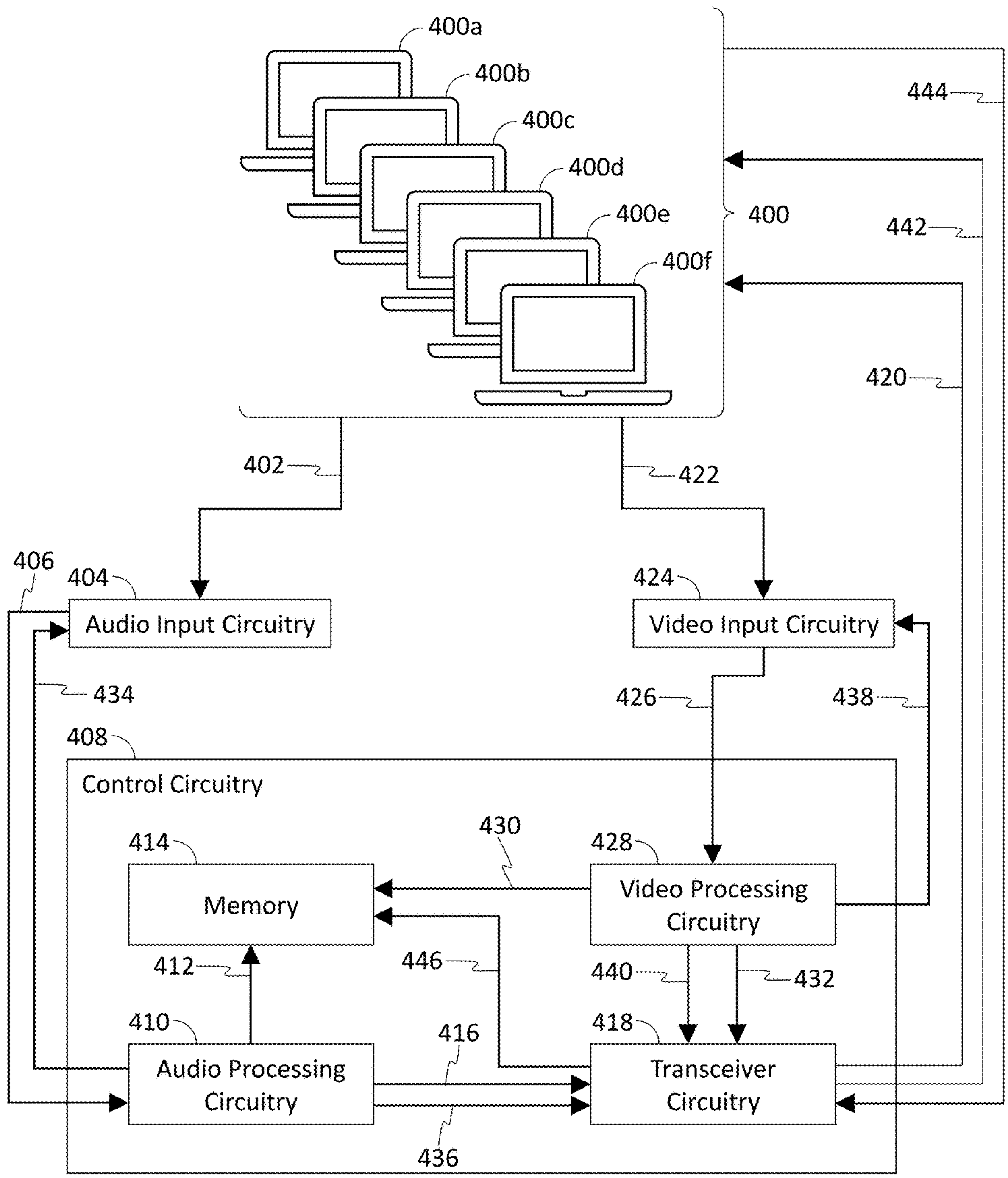
FIG. 4 is a block diagram showing components and dataflow therebetween of a system for selecting a device in a collaborative environment setting, in accordance with some embodiments of the disclosure.

FIG. 4 is a block diagram showing components and dataflow therebetween of a system for selecting a device in a collaborative environment setting, in accordance with some embodiments of the disclosure. Audio input circuitry 404 receives a plurality of audio signals 402 from a plurality of Devices 400 (comprising individual devices 400*a*-400*f*) in the environment. Audio input circuitry 404 may be part of a media device on which the system of the present disclosure is implemented, or may be a separate device, such as an Amazon Echo® or Google Home® device, or any other device capable of receiving and relaying user input to a media device. The device may be a conference call hub, of the type to be placed in the center of a meeting table, or optionally a spoke attached thereto. Audio input circuitry 404 may be a data interface such as a Bluetooth module, WiFi module, or other suitable data interface through which data entered on another device or audio data captured by another device can be received. Alternatively, audio input circuitry 404 may include a microphone through which audio information is captured directly. Audio input circuitry 404 may convert the audio to a digital format such as WAV. Audio input circuitry 404 transmits 406 the audio signal (usually a voice signal) to control circuitry 408. Control circuitry 408 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The audio signals are received by audio processing circuitry 410. Audio processing circuitry 410 may be any suitable circuitry configured to perform audio analysis functions, such as volume, frequency domain analysis, level and gain analysis, harmonic distortion analysis, etc. Audio processing circuitry 410 analyzes the quality of each separate audio signal received from each individual device to identify one audio signal that has the highest quality, which may be a function of characteristics such as volume, clarity, interference, frequency and consistency. Audio processing circuitry 410 transmits 412 the characteristics to memory 414 for storage in a device database or other data structure associated with the environment. In some embodiments, the device database is stored remotely. Audio processing circuitry 410 may therefore transmit 416 the audio characteristics for each device to transceiver circuitry 418. Transceiver circuitry 418 may be a network connection such as an Ethernet port, WiFi module, or any other data connection suitable for communicating with a remote server. Each device may transmit 444 its own characteristics directly to the control circuitry 408 to be received by the transceiver circuitry 418 to be transmitted 446 and stored in the memory.

Video input circuitry 424 receives 422 a plurality of video signals from a plurality of Devices 400 in the environment. Video input circuitry 424 may be part of a media device on which the system of the present disclosure is implemented, or may be a separate device, such as a laptop computer, a webcam, or any other device capable of receiving and relaying user input to a media device. Video input circuitry 424 may be a data interface such as a Bluetooth module, WiFi module, or other suitable data interface through which data entered on another device or video data captured by another device can be received. Alternatively, video input circuitry 424 may include a camera through which video information is captured directly. Video input circuitry 424 may convert the video to a digital format such as MPEG. Video input circuitry 424 transmits 426 the video signal to the control circuitry 408, as described above.

The video signals are received by video processing circuitry 428. Video processing circuitry 428 may be any suitable circuitry configured to perform video analysis functions, such as brightness, contrast, color balance or focus. Video processing circuitry 428 analyzes the quality of each separate video signal received from each individual device to identify one video signal that has the highest quality, which may be a function of characteristics such as clarity, interference, resolution and consistency. Video processing circuitry 428 transmits 430 the characteristics to memory 414 for storage in a device database associated with the environment. In some embodiments, the device database is stored remotely, as described above. Video processing circuitry 428 may therefore transmit 432 the video characteristics for each device to transceiver circuitry 418. Transceiver circuitry 418 then transmits 442 instructions for video characteristics to the plurality of Devices 400.

Once the audio signal from each device in the environment has been received, audio processing circuitry 410 compares the quality of the characteristics of the audio signal from each device. The data relating to the quality of each signal from each device may be stored in the memory 414. Control circuitry 408 may retrieve the stored quality data and/or other characteristics of each device and compare those data to identify the device with the highest quality or best characteristic for each function to be performed in the collaborative environment. For example, to identify the best device to perform the audio input function, control circuitry 408 may compare stored characteristics of each device relating to audio input, such as microphone quality. In some cases, multiple characteristics may be relevant to a single function. For example, to identify the best device to perform the video input function, control circuitry 408 may compare stored characteristics of each device relating not only to camera quality, but also to system processing speed, available video compression codecs, and available bandwidth, as each of these characteristics can affect video quality. In some embodiments, audio processing circuitry 410 determines which device has the highest-quality audio signal, and audio processing circuitry 410 prevents transmission of the audio signal from other devices that do not have the highest quality of audio signal. For example, audio processing circuitry 410 may transmit 434 a command signal to audio input circuitry 404 to mute a microphone of one or more of Devices 400*a-f* for a predetermined period of time, such as the duration of the collaborative environment, or until the audio signals are compared again within the duration of the collaborative environment. Alternatively, the command signal may cause audio input circuitry 404 to stop transmitting audio data to control circuitry 408 for the predetermined period of time or the duration of the setting. As another alternative, the command signal may be transmitted directly to non-selected devices. The command signal may be a data packet, which may require the transmission of a second data packet at the end of the predetermined period of time to reenable audio input circuitry 404. Alternatively, for devices that communicate with control circuitry 408 over a physical connection, such as USB or Ethernet cable, the command signal may be a voltage level that remains constant at the signaling voltage level during the predetermined period of time, after which the level changes.

At the end of the predetermined period of time, audio processing circuitry may compare the audio signals from each of the plurality of devices to determine which device has the highest quality audio signal. If the Device 400*a-f* within the plurality of Devices 400 that was selected to transmit the audio signal is no longer the highest quality, audio processing circuitry 410 transmits 436 a command signal to transceiver circuitry 418. Transceiver circuitry 418 in turn transmits 420 the command signal to the device, within the plurality of devices 400 with the highest audio quality such that that device having the highest quality audio signal transmits the audio signal and the remaining devices in the setting are muted or prevented from transmitting their audio signals, as described above.

Once the video signal from each device in the environment has been received, video processing circuitry 428 compares the characteristics of the video signals. Video processing circuitry determines which Device 400*a-f* within the plurality of Devices 400 has the highest-quality video signal and video processing circuitry 428 prevents transmission of the video signal from other devices that do not have the highest quality of video signal. For example, video processing circuitry 428 may transmit 438 a command signal to video input circuitry 424 to stop the video capability of video input circuitry 424 of a device for a predetermined period of time, such as the duration of the collaborative environment setting or until the video signals are compared again. Alternatively, the command signal may cause video input circuitry 424 to stop transmitting video data to control circuitry 408 for the predetermined period of time or the duration of the setting. The command signal may be a data packet, which may require the transmission of a second data packet at the end of the predetermined period of time to reenable video input circuitry 424. Alternatively, the signal may be a voltage level that remains constant at the signaling voltage level during the predetermined period of time, after which the level changes. At the end of the predetermined period of time, video processing circuitry may compare the video signals from each of the plurality of devices to determine which device has the highest quality video signal.

If the device selected to transmit the video signal is no longer the highest quality, video processing circuitry 428 transmits 440 a command signal to transceiver circuitry 418. Transceiver circuitry 418 in turn transmits 442 the command signal to the Device 400*a-f* within the plurality of Devices 400 with the highest video quality such that that device transmits the video signal and the remaining devices in the setting are prevented from using their video capabilities or prevented from transmitting their video signals, as described above.

Figure 5:
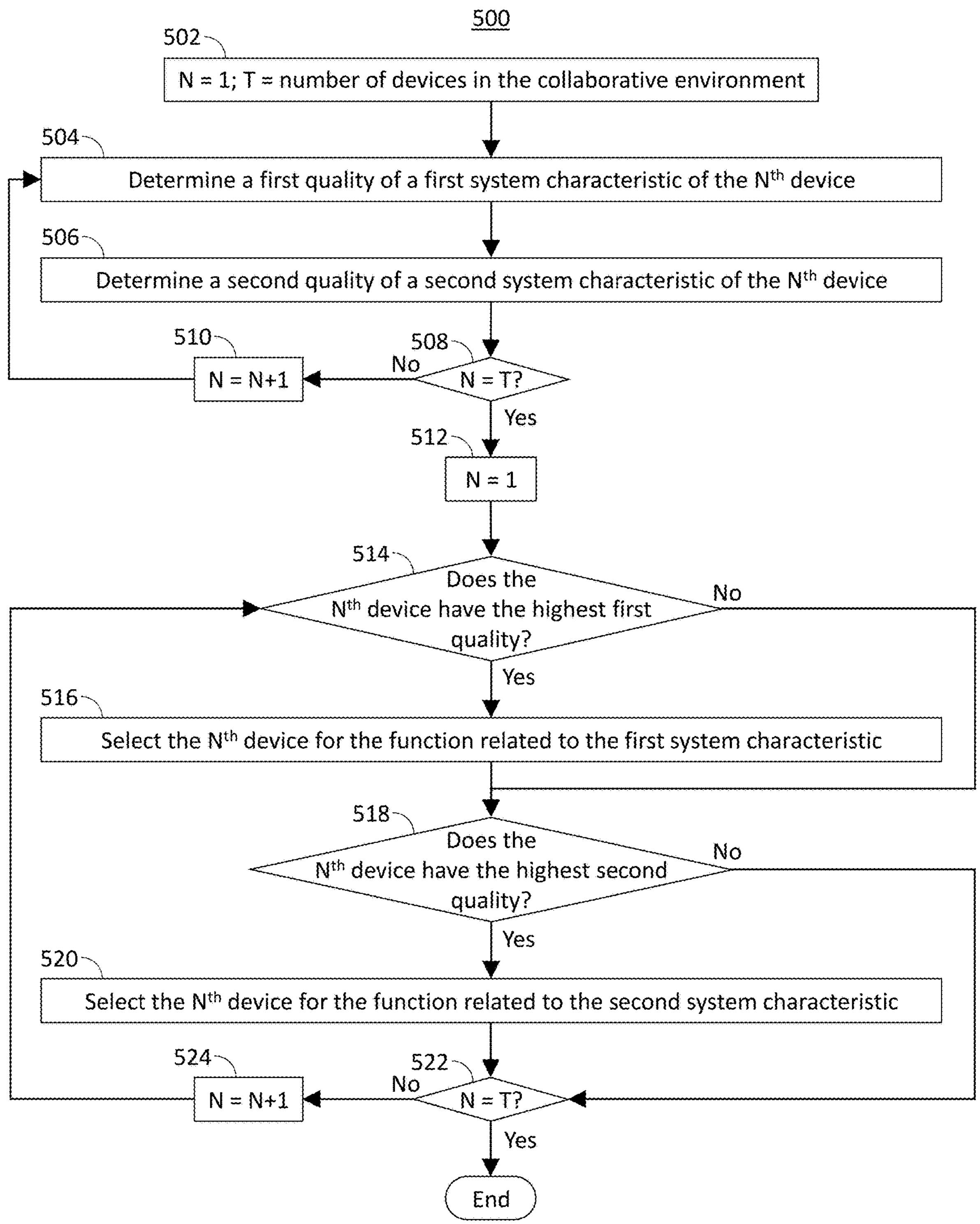
FIG. 5 is a flowchart representing an illustrative process for selecting a local device in a collaborative environment setting, in accordance with some embodiments of the disclosure.

FIG. 5 is a flowchart representing an illustrative process 500 for selecting a local device in a collaborative environment setting, in accordance with some embodiments of the disclosure. The process may be implemented on control circuitry 408. In addition, one or more actions of process 500 may be incorporated into or combined with one or more actions of any other process or embodiment described herein.

At 502, control circuitry 408 initializes a counter variable N, setting its value to 1, and a variable T, setting its value equal to the total number of devices in the collaborative environment. At 504, control circuitry 408 determines a first quality of a first system characteristic of the $N^{th}$ device in the collaborative environment setting. The first system characteristic may be an audio signal, or a video signal, or it may be the remaining power on a device, the running speed or the internet connection or any other characteristic that is relevant for a device being able to join a collaborative environment such as a virtual meeting, e.g., a conference call or a video call. The device may be a laptop computer, a tablet, a mobile telephone, a conference call hub, a projector or a separate AV system.

At 506, control circuitry 408 determines a second quality of a second system characteristic of the $N^{th}$ device in the collaborative environment setting. The second system characteristic may be different from the first system characteristic.

At 508, the control circuitry 408 determines whether N is equal to T, meaning that the quality of the first and second characteristics of all devices in the collaborative environment have been determined. If not ("No" at 508), then, at 510, control circuitry 408 increments the value of N by one and processing returns to 504. If the first and second characteristics of all devices in the collaborative environment have been determined ("Yes" at 508), then, at 512, control circuitry resets the value of N to 1 once again and, at 514, determines whether the $N^{th}$ device has the highest first quality. If so ("Yes" at 514), then, at 516, control circuitry 408 selects the $N^{th}$ device for the function related to the first system characteristic. In either case, control circuitry 408 proceeds to determine, at 518, whether the $N^{th}$ device has the highest second quality. If so ("Yes" at 518), then, at 520, control circuitry 408 selects the $N^{th}$ device for the function related to the second system characteristic.

At 514 it is determined whether the device has the highest quality for a system characteristic by comparing the quality of the characteristic of the Nth device to the quality of the N+1 th device, N+2th device and so on, the quality of the system characteristics having been determined for each during the process 502-512. Such data relating to the quality of a system characteristic may be stored in a database of device parameters or other memory, represented by 414 in FIG. 4.

Whether or not the $N^{th}$ device is selected for any function, control circuitry 408 proceeds to determine, at 522, whether N is equal to T, meaning that the first and second quality levels for every device in the collaborative environment have been checked. If not ("No" at 522), then, at 524, control circuitry 408 increments the value of N by one and processing returns to 514. If so ("Yes" at 522), then the process ends.

In some embodiments, prior to determining, at 522, whether the quality levels of each device have been checked, control circuitry 408 may determine whether a device has been selected for each function. If so, the process may end without checking the quality levels of the remaining devices in order to reduce the amount of processing required by control circuitry 408.

The actions and descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
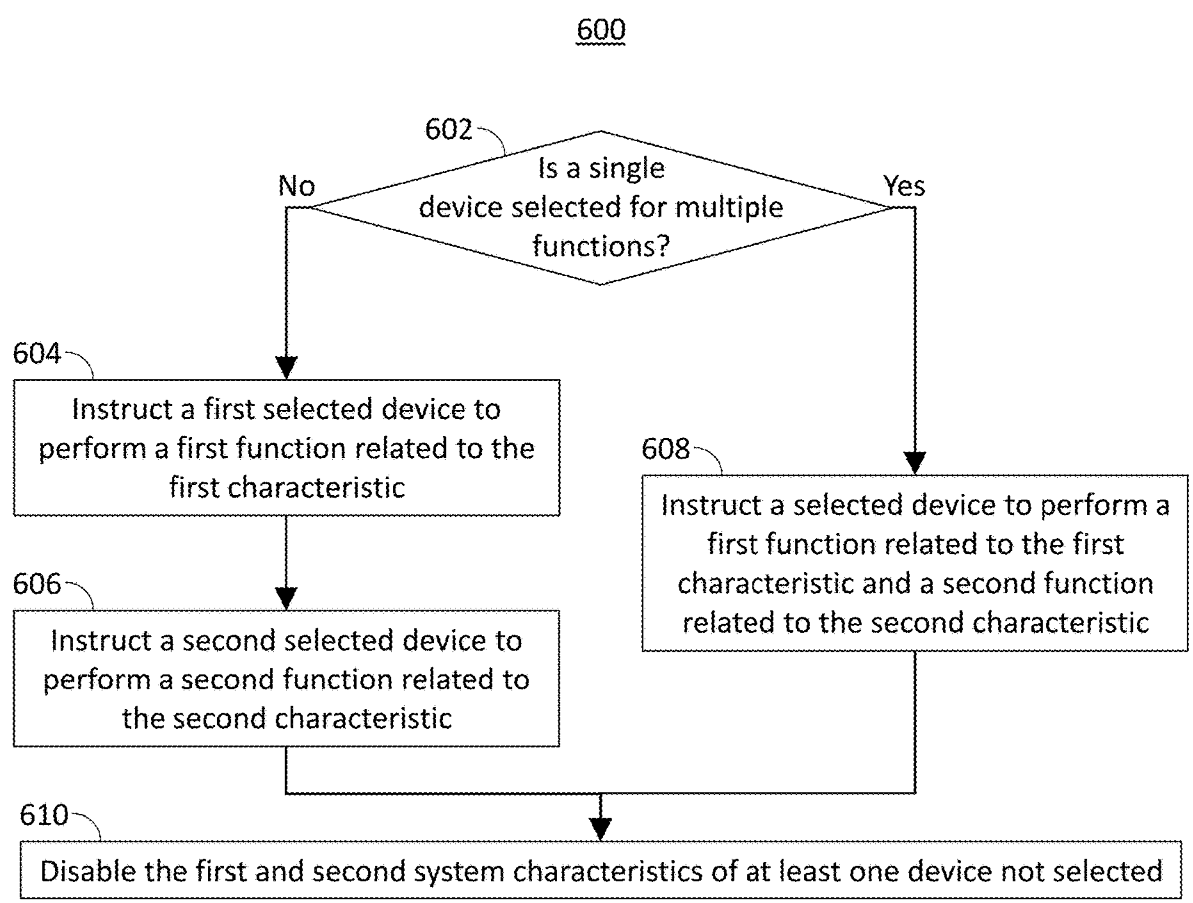
FIG. 6 is a flowchart representing an illustrative process for instructing devices to perform first and second functions, respectively, in accordance with some embodiments of the disclosure.

FIG. 6 is a flowchart representing an illustrative process 600 for instructing a first device and a second device to perform first and second functions, respectively, in accordance with some embodiments of the disclosure. At 602, control circuitry 408 determines whether a single device is selected to perform multiple functions. For example, control circuitry 408 may track or store in memory 414 an identifier or other indication of each selected device in association with the function for which each respective device has been selected. Control circuitry 408 may retrieve and/or compare these identifiers to determine whether the same device has been selected for more than one function. If more than one device has been selected ("No" at 602"), then, at 604, control circuitry 408 instructs a first selected device to perform a first function related to the first characteristic and, at 606, instructs a second selected device to perform a second function related to the second characteristic. If a single device has been selected for multiple functions ("Yes" at 602), then, at 610, control circuitry 408 instructs a selected device to perform a first function related to the first characteristic and instructs the same device to perform a second function related to the second characteristic. The first and second functions may be microphone, video, speaker, display, recording, or the like. At 610, the first and second system characteristics of at least one device not selected are disabled. They may be disabled by way of turning off that function working on the device itself (e.g., muting the microphone, turning off the camera etc.), or blocking a signal from the control circuitry to the device for that function. For example, control circuitry 408 may transmit, via transceiver circuitry 418, instructions to non-selected devices to disable certain systems components. For example, a device not selected to act as the audio input for the collaborative environment may be instructed to mute or otherwise disable its microphone.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
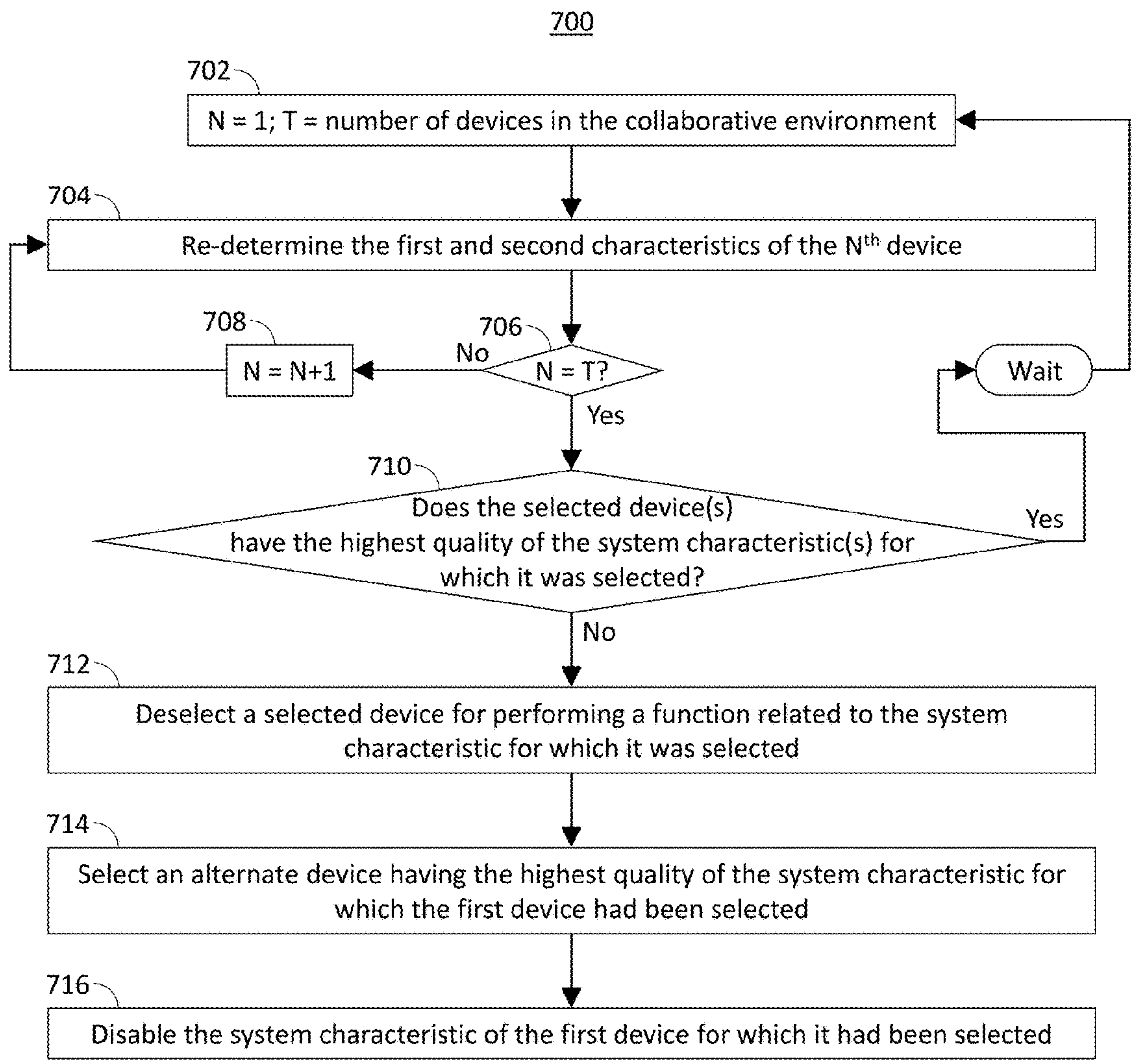
FIG. 7 is a flowchart representing an illustrative process for periodically redetermining the device to select in a collaborative environment setting, deselecting the selected device and reselecting a different device, in accordance with some embodiments of the disclosure.

FIG. 7 is a flowchart representing an illustrative process 700 for periodically reviewing the plurality of devices, deselecting a local device in a collaborative environment setting and reselecting a different device, in accordance with some embodiments of the disclosure. The process may be implemented on control circuitry 408. In addition, one or more actions of process 700 may be incorporated into or combined with one or more actions of any other process or embodiment described herein. At 702, control circuitry 408 initializes a counter variable N, setting its value to 1, and a variable T, setting its value to the number of devices present in the collaborative environment. At 704, control circuitry 408 re-determines, after a predetermined period of time, a first quality of first and second system characteristics of the $N^{th}$ device in the collaborative environment. The first and second system characteristic may be an audio signal, or a video signal, or the remaining power on a device, the running speed or the internet connection or any other characteristic that is relevant for a device being able to join a collaborative environment such as a virtual meeting, e.g., a conference call or a video call. The device may be a laptop computer, a tablet, a mobile telephone, a conference call hub, a projector or a separate AV system.

At 706, control circuitry 408 determines whether N is equal to T, meaning that the first and second characteristics of every device in the collaborative environment have been redetermined. If N is not equal to T ("No" at 706), then, at 708, control circuitry 408 increments the value of N by one and processing returns to 704. If N is equal to T, then, at 710, control circuitry 408 determines whether the selected device(s) have the highest quality characteristic for which it was selected. This may be accomplished using methods described above in connection with FIG. 5.

If the selected device(s) have the highest quality characteristic for which they were each selected ("Yes" at 710), then control circuitry 408 may wait a predetermined period of time before processing returns to 702. The predetermined time may be regular intervals of, say, 30 seconds throughout the duration of the collaborative environment setting. The intervals may be seconds, 20 seconds, 45 seconds, 1 minute, 2 minutes, 3 minutes, 4 minutes, 5 minutes, 10 minutes, 20 minutes or 30 minutes. If any of the selected devices does not have the highest quality of the characteristic for which it was selected ("No" at 710), then, at 712, control circuitry 408 deselects the respective selected device for performing a function related to the system characteristic for which it was selected, and, at 714, selects an alternative device having the highest quality of the system characteristic for which the deselected device had been selected. At 716, control circuitry 408 disables the system characteristic for which the deselected device had been selected. Disabling may be, for example, muting the microphone of the device, or blocking an audio signal from being processed by audio processing circuitry 410 of control circuitry 408. Disabling may also be turning off the camera of the device, or blocking a video signal between video input circuitry 424 and video processing circuitry 428.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
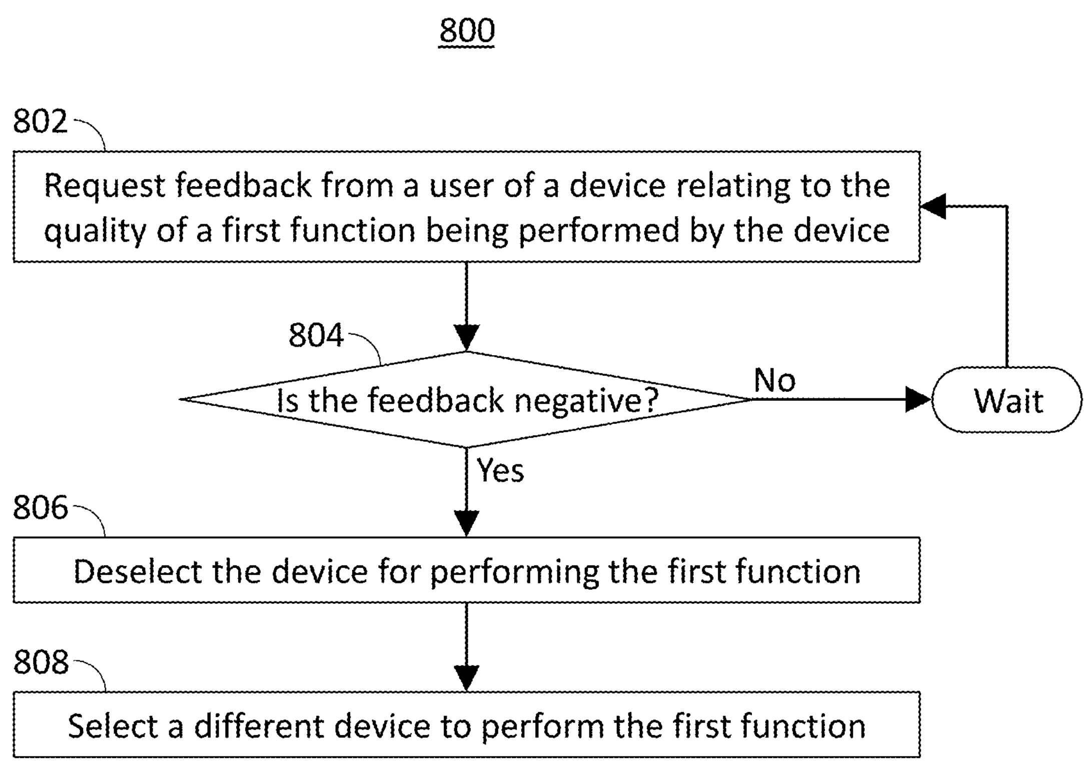
FIG. 8 is a flowchart representing an illustrative process for deselecting a local device in a collaborative environment setting in response to user feedback and selecting a different device, in accordance with some embodiments of the disclosure.

FIG. 8 is a flowchart representing an illustrative process 800 for deselecting a local device in a collaborative environment setting in response to user feedback and reselecting a different device, in accordance with some embodiments of the disclosure. The process may be implemented on control circuitry 408. In addition, one or more actions of process 800 may be incorporated into or combined with one or more actions of any other process or embodiment described herein.

At 802, user feedback is requested relating to the quality of the first function being performed by the device. The feedback may be requested by way of a dialogue box appearing on a display of the device directly asking the user whether the quality of the function is high enough for the device to continue to perform the function. Such a dialogue box may ask "IS THE SPEAKER QUALITY OF THIS DEVICE SATISFACTORY FOR THIS MEETING?". The dialogue box may be presented in response to control circuitry 408 transmitting, via transceiver circuitry 418, an instruction, request, or other command to one or more devices in the collaborative environment. The user may be given an option to click "YES" or "NO". At 804, control circuitry 408 determines whether the feedback received from the user is negative. If so ("Yes" at 804), then, at 806, control circuitry 408 deselects the device performing the function, and, at 808, a different device is selected to perform the function. These actions may be accomplished using methods described above in connection with FIG. 7. If the feedback is positive ("No" at 804), then control circuitry 408 waits for a predetermined period of time before returning to 802 and requesting feedback from the user again.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to the what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

determining that a first device is performing a function in a collaborative environment setting, wherein the function is relevant to a system characteristic;

determining a first quality of the system characteristic of the first device;

in response to determining a change in the first quality:

identifying a plurality of devices in the collaborative environment setting, wherein the plurality of devices corresponds to a plurality of qualities of the system characteristic;

comparing the changed first quality to the plurality of qualities; and selecting, based on the comparing, a second device of the plurality of devices for performing the function in the collaborative environment setting, wherein the second device corresponds to a second quality of the plurality of qualities of the system characteristic.

2. The method of claim 1, wherein the second quality is a higher quality than the changed first quality of the system characteristic.

3. The method of claim 2, wherein the second quality is a highest quality of the plurality of qualities of the system characteristic.

4. The method of claim 1, further comprising:

disabling the function on the first device; and causing the selected second device to perform the function in the collaborative environment setting instead of the first device.

5. The method of claim 1, wherein the change in the first quality comprises an interruption at the first device in performing the function.

6. The method of claim 1, wherein the first quality of the system characteristic of the first device is periodically determined for a duration of the collaborative environment setting.

7. The method of claim 1, further comprising causing to be displayed a notification comprising one or more selectable options to request device feedback.

8. The method of claim 1, wherein the system characteristic is selected from a list consisting of microphone quality, speaker quality, video capture quality, video display quality, screen resolution, power availability, internet connection quality, network bandwidth and device operating system speed.

9. The method of claim 1, further comprising causing to be outputted a notification that the second device has been selected for performing the function.

10. The method of claim 1, wherein the system characteristic is a first system characteristic, and wherein the function is a first function, the method further comprising:

determining that a device of the first device or the second device has a highest quality of a second system characteristic; and selecting the determined device to perform a second function in the collaborative environment setting that is relevant to the second system characteristic.

11. A system comprising:

communication circuitry configured to receive and transmit data between devices; and control circuitry configured to:

determine that a first device is performing a function in a collaborative environment setting, wherein the function is relevant to a system characteristic;

determine a first quality of the system characteristic of the first device;

in response to determining a change in the first quality:

identify a plurality of devices in the collaborative environment setting, wherein the plurality of devices corresponds to a plurality of qualities of the system characteristic;

compare the changed first quality to the plurality of qualities; and select, based on comparing the changed first quality to the plurality of qualities, a second device of the plurality of devices for performing the function in the collaborative environment setting, wherein the second device corresponds to a second quality of the plurality of qualities of the system characteristic.

12. The system of claim 11, wherein the second quality is a higher quality than the changed first quality of the system characteristic.

13. The system of claim 12, wherein the second quality is a highest quality of the plurality of qualities of the system characteristic.

14. The system of claim 11, wherein the control circuitry is further configured to:

disable the function on the first device; and cause the selected second device to perform the function in the collaborative environment setting instead of the first device.

15. The system of claim 11, wherein the change in the first quality comprises an interruption at the first device in performing the function.

16. The system of claim 11, wherein the control circuitry is configured to periodically determine the first quality of the system characteristic of the first device for a duration of the collaborative environment setting.

17. The system of claim 11, wherein the control circuitry is further configured to cause to be displayed a notification comprising one or more selectable options to request device feedback.

18. The system of claim 11, wherein the system characteristic is selected from a list consisting of microphone quality, speaker quality, video capture quality, video display quality, screen resolution, power availability, internet connection quality, network bandwidth and device operating system speed.

19. The system of claim 11, wherein the control circuitry is further configured to cause to be outputted a notification that the second device has been selected for performing the function.

20. The system of claim 11, wherein the system characteristic is a first system characteristic, and the function is a first function, and wherein the control circuitry is further configured to:

determine that a device of the first device or the second device has a highest quality of a second system characteristic; and select the determined device to perform a second function in the collaborative environment setting that is relevant to the second system characteristic.

* * * * *